(12) United States Patent
Kim

(10) Patent No.: US 7,531,267 B2
(45) Date of Patent: May 12, 2009

(54) PROCESS FOR PREPARING CARBON NANOTUBE ELECTRODE COMPRISING SULFUR OR METAL NANOPARTICLES AS A BINDER

(75) Inventor: Young Nam Kim, Kyungbook (KR)

(73) Assignee: KH Chemicals Co., Ltd., Seoul (KR)

( * ) Notice: Subject to any disclaimer, the term of this patent is extended or adjusted under 35 U.S.C. 154(b) by 412 days.

(21) Appl. No.: 10/783,265

(22) Filed: Feb. 19, 2004

(65) Prior Publication Data

US 2004/0241532 A1 Dec. 2, 2004

(30) Foreign Application Priority Data

Jun. 2, 2003 (KR) ............ 10-2003-0035342
Jan. 14, 2004 (KR) ............ 10-2004-0002723

(51) Int. Cl.
*H01M 4/96* (2006.01)
*H01M 4/58* (2006.01)
*H01M 4/88* (2006.01)

(52) U.S. Cl. ............ 429/44; 429/231.8; 502/101; 252/182.1

(58) Field of Classification Search ............ 429/44, 429/231.8; 502/101; 252/182.1
See application file for complete search history.

(56) References Cited

U.S. PATENT DOCUMENTS

| | | | |
|---|---|---|---|
| 4,448,856 A | 5/1984 | Zuckerbrod et al. | |
| 4,562,511 A | 12/1985 | Nishino et al. | |
| 4,743,185 A * | 5/1988 | Vu et al. | 419/23 |
| 5,072,336 A | 12/1991 | Kurabayashi et al. | |
| 5,080,963 A | 1/1992 | Tatarchuk et al. | |
| 5,099,398 A | 3/1992 | Kurabayashi et al. | |
| 5,102,745 A | 4/1992 | Tatarchuk et al. | |
| 5,121,301 A | 6/1992 | Kurabayashi et al. | |
| 5,142,451 A | 8/1992 | Kurabayashi et al. | |
| 5,304,330 A | 4/1994 | Tatarchuk et al. | |
| 5,777,428 A | 7/1998 | Farahmandi et al. | |

(Continued)

FOREIGN PATENT DOCUMENTS

CN 1357899 A 7/2002

(Continued)

OTHER PUBLICATIONS

Bentor, Yinon. ChemicalElement.com. 1996-2006.*

(Continued)

*Primary Examiner*—Mark Ruthkosky
*Assistant Examiner*—Karie O'Neill
(74) *Attorney, Agent, or Firm*—Blakely, Sokoloff, Taylor & Zafman LLP

(57) ABSTRACT

The present invention provides an electrode made of carbon nanotubes or carbon nanofibers and a process for preparing the same. The electrode comprising a current collector, sulfur or metal nanoparicles as a binder, and carbon nanotubes or carbon nanofibers is characterized in that the sulfur or metal nanoparticles are bonded, deposited, or fused on the surfaces of the carbon nanotubes or carbon nanofibers so that the carbon nanotubes or carbon nanofibers are bonded to each other and also bonded to the current collector. The electrode prepared according to the present invention exhibits low internal resistance, strong durability and low equivalent series resistance, and therefore the electrode can be effectively used for secondary batteries, supercapacitors or fuel cells.

16 Claims, 1 Drawing Sheet

U.S. PATENT DOCUMENTS

| | | | |
|---|---|---|---|
| 6,059,847 | A | 5/2000 | Farahmandi et al. |
| 6,194,099 | B1 | 2/2001 | Gernov et al. |
| 6,280,697 | B1 | 8/2001 | Zhou et al. |
| 6,395,214 | B1 * | 5/2002 | Kear et al. ............... 264/434 |
| 6,485,858 | B1 | 11/2002 | Baker et al. |
| 6,825,595 | B2 | 11/2004 | Jin et al. |
| 7,029,796 | B2 * | 4/2006 | Choi et al. ............... 429/232 |
| 2003/0151030 | A1 * | 8/2003 | Gurin ...................... 252/502 |
| 2003/0152835 | A1 * | 8/2003 | Dasgupta et al. ......... 429/232 |
| 2004/0018416 | A1 * | 1/2004 | Choi et al. .................. 429/44 |

FOREIGN PATENT DOCUMENTS

| | | |
|---|---|---|
| CN | 1388540 A | 1/2003 |
| EP | 1331202 A2 | 7/2003 |
| JP | 2002110176 A | 4/2002 |
| WO | WO 2005/069412 A1 | 7/2005 |

OTHER PUBLICATIONS

Kazuyoshi Tanaka (Edited by), "The Science and Technology of Carbon Nanotubes", Elsevier, 1999, Title page and pp. 144-145. (3 pages).

Cassell, Alan M. et al., "Graphite Electrodes Containing Nanometer-Sized Metal Particles and Rheir Use in the Synthesis of Single-Walled Carbon Nanotube Composites", Chem. Mater., 1996, (8(7), 1545-1549, ISSN 0897-4756.

Lee, Jeong-O et al., Formation of low-resistance ohmic contacts between carbon nanotube and metal electrodes by a rapid thermal annealing method, Journal of Physics D: Applied Physics, 2000, 33(16_, 1953-1956, ISSN 0022-3727.

Niu et al., "High Power Electrochemical Capacitors Based on Carbon Nanotube Electrodes", *Applied Physics Letters*, 70, pp. 1480-1482 (1997).

Ma, R.Z. et al., "Study of Electrochemical Capacitors Utilizing Carbon Nanotube Electrodes", *Journal of Power Sources*, 84, pp. 126-129 (1999).

An, Kay Hyeok et al., "Supercapacitors Using Single-Walled Carbon Nanotube Electrodes", *Advanced Materials*, 13, pp. 479-500 (2001).

Emmenegger et al., "Carbon Nanotube Synthesized on Metallic Substrates", *Applied Surface Science*, 162-163, pp. 452-456 (2000).

PCT International Search Report for PCT/KR/2005/000064, Mailing date Mar. 31, 2005, 4 pgs.

PCT Int'l. Preliminary Report on Patentability for PCT/KR/2005/000064, Mailing date Mar. 31, 2005, 6 pgs.

PCT Written Opinion of the Int'l Searching Authority for PCT/KR/2005/000064, Mailing date Mar. 31, 2005, 5 pgs.

* cited by examiner

PROCESS FOR PREPARING CARBON NANOTUBE ELECTRODE COMPRISING SULFUR OR METAL NANOPARTICLES AS A BINDER

CROSS-REFERENCE TO OTHER APPLICATIONS

This Application claims priority from Korean Patent Application No. 2003-35342 filed on Jun. 2, 2003, and Korean Patent Application No. 2004-2723 filed on Jan. 14, 2004.

FIELD OF THE INVENTION

The present invention relates to carbon nanotube or carbon nanofiber electrodes in which the binding within the electrode material comprising carbon nanotubes or carbon nanofibers as well as between the electrode material and the current collector is achieved by using sulfur or metal nanoparticles as a binder and by heating and/or pressing the electrode system, and to a process for preparing the same. This invention also relates to the use of the carbon nanotube or carbon nanofiber electrode in secondary batteries, supercapacitors or fuel cells.

DESCRIPTION OF THE PRIOR ART

Recently, attention to energy storage devices has increased with the transition to an information-oriented society and the advent of portable electronic equipment.

Secondary batteries to store energy using electrochemical reactions have a high energy density, but their power density is low. For this reason, secondary batteries are incapable of generating an instantaneous high power when they are applied to systems demanding a variable power such as electric vehicles or mobile communications equipment, their lifetime and performance may be reduced, and also they take a long charging/discharging time. Therefore, these features of secondary batteries impose limitations on using them.

Meanwhile, capacitors have a very short charging/discharging time, long lifetime, and high power density. However, conventionally used electrical capacitors have a very low energy density so that there are lots of limitations on using capacitors as an energy storage device.

On the other hand, electrochemical capacitors have a characteristic intermediate between electric capacitors and secondary batteries. They have not only a very short charging time but also a high power density, thus enabling to generate a high power. They also have a high energy density, and thus can discharge for a long time. Therefore, they are called supercapacitors or ultracapacitors (hereinafter, the electrochemical capacitors are referred to supercapacitors)

An electric double layer capacitor (EDLC) storing energy by means of an electric double layer is a type of supercapacitors and comprises electrodes to collect electricity, an electrolyte and a separating membrane. Among these, the electrode constituting the most important part of the supercapacitor is required to have characteristics such as high electronic conductivity, large surface area, electrochemical inactivity, and ease of molding and processability. Therefore, highly porous carbonaceous materials are generally used as an electrode material due to their high electric conductivity (for example, the conductivities of copper, graphite and semiconductive germanium are $5.88 \times 10^5$, $1.25 \times 10^3$ and $1.25 \times 10^{-2}$ S/cm, respectively), and good moldability and processability.

Porous carbonaceous materials include activated carbons, activated carbon fibers, amorphous carbons, carbon aerosols or carbon composites. Among these carbon materials, the most frequently used material at present is activated carbon-containing materials woven in a fibrous form. Although activated carbons and activated carbon fibers have a large surface area of about 1000 to 3000 $m^2$/g, most of the surface area resides in their micropores (<20 Å) which do not contribute to the role as an electrode, and their effective pores occupy only from 20 to 30% of the total surface area. This feature of activated carbons and activated carbon fibers is a drawback for using them as an electrode material.

Since the first synthesis of carbon nanotubes and carbon nanofibers in the early 1990's, there have been considerable attempts to use these carbon materials as an electrode material due to their superb characteristics. Carbon nanofibers (GNF, Graphite Nano-Fiber) mentioned herein are similar to carbon nanotubes in shape and diameter, but mean carbon composites in a non-hollow, fibrous form having a diameter of up to a few hundred nanometers, whereas carbon nanotubes are in the form of a hollow tube as indicated in their name. Activated carbon fibers can be prepared by spinning to result in a few micrometers in diameter and a few hundred meters in length, whereas carbon nanofibers which are catalytically synthesized like carbon nanotubes have a diameter of up to a few hundred nanometers and a length of up to a few tens of micrometers. Carbon nanofibers can be formed using a method similar to the synthetic methods for carbon nanotubes.

Compared to other carbon materials, carbon nanotubes or carbon nanofibers have a definite pore size distribution in the order of nanometers, a large surface area accessible by the ions of the electrolyte and a highly stable chemical structure. When carbon nanotubes or carbon nanofibers are used as an electrode material, the resistance of the fabricated electrode itself is very low. In addition, carbon nanotubes or carbon nanofibers have an electric conductivity of up to $1.0 \times 10^4$ S/cm, the effective use rate of their specific surface area reaches almost 100%, and the highest value of their specific surface area known to the present is about 500 $m^2$/g. All these features of carbon nanotubes or carbon nanofibers provide the perfect conditions that an electrode is required of in fabricating supercapacitors of high energy and long lifetime.

Moreover, it has been studied that carbon nanotubes having a herring bone structure exhibit superior electric properties because they comprise many exposed edges having higher capacitance than the basal plane of graphite.

On the other hand, as the key factors to determine a power and frequency response of a supercapacitor, mention may be made of the resistance of the electrode materials and the resistance of the electrolyte within the pores of the electrode. If the size of the pores is small, the resistance of the electrolyte increases as the electrolyte migrates into the pores. Therefore, supercapacitors comprising activated carbon materials are incapable of storing a large amount of energy although activated carbon materials have a large surface area as mentioned above. Moreover, the stored energy can be withdrawn only at low frequencies not greater than 100 mHz and by DC voltage because activated carbon materials have a broad pore size distribution. Such properties of activated carbon materials explain the reason why supercapacitors comprising activated carbons are not easily generalized in spite of current considerable efforts in improvement.

Accordingly, the use of carbon nanotubes or carbon nanofibers as an electrode material makes it possible to fabricate supercapacitors capable of dealing with energy of high frequencies. This feature of carbon nanotubes or carbon nanofibers demonstrates that these carbon nanomaterials are supeiror to any other carbon-containing materials and are the most suitable material for the electrodes of supercapacitors.

Furthermore, one of the problems to be considered when fabricating a carbon electrode used for supercapacitors is to decrease the internal resistance of an electrode. The internal resistance of an electrode results in loss of energy, thus lowering performance of supercapacitors.

Generally, the maximum power density that can be obtained from supercapacitors is given by the following Equation 1;

$$P_{max} = V_i^2/4R \qquad \text{[Equation 1]}$$

where $V_i$ is the initial voltage and R is the equivalent series resistance (ESR) [B. E. Conway, Electrochemical Supercapacitors: *Scientific Fundamentals and Technological Applications*, Kluwer Academic/Plenum Publishers, New York 1999, Ch. 15].

Therefore, the internal resistance of an electrode itself is an important factor determining the power density of supercapacitors comprising carbon electrodes. The internal resistance of a carbon electrode itself consists of (i) the contact resistance between the carbon particles forming the electrode, (ii) the resistance between the electrolyte and the electrode material, and (iii) the contact resistance between the electrode and the current collector. Among these resistances, the contact resistance between carbon particles and the contact resistance between the electrode and the current collector can be improved during the process for fabricating an electrode.

First, there have been suggested various types of electrodes and preparation methods therefor in order to improve the contact resistance between carbon particles forming the electrode.

In view of improving the internal resistance of an electrode, when the electrode material is a traditional carbonaceous material such as activated carbon or activated carbon fiber, it has been a practice to fabricate the electrode as a compressed type, a binder type, a matrix type, a monolith type, a cloth type or a film type.

The compressed type is prepared by pressing an electrode material of carbon particles under pressure, thus improving the contact between the carbon particles, and is mostly used together with other types of carbon materials. The binder type is made using a binder such as PTFE (polytetrafluoroethylene), thus improving the contact characteristic between the carbon particles. The matrix type is formed by mixing activated carbon particles with a polymer matrix and then carbonizing this mixture. While the binder itself in the binder type is incapable of acting as an electrode, the polymer in the matrix type can act as an electrode as well as can achieve the binding between carbon particles. The monolith type comprises carbon aerosols, carbon foams, and the like. Because these materials are porous whole units and have continuous carbon backbones, the contact within the carbon electrode materials needs not be considered. The film type involves non-porous carbon materials, and an electrolyte is not included within the electrode but is contained only in the separating membrane. Amorphous carbons can be used for the film type. The cloth type, which is made of activated carbon fibers, is the most widely used type in making a carbon electrode.

The above-mentioned types of electrodes and fabricating methods therefor have been attempted in order to improve the resistance of the electrodes comprising activated carbon per se, which has been most extensively investigated thus far, or the contact resistance between the electrolyte and the electrode.

As examples of the method to reduce the contact resistance within the carbon material forming the electrode, mention may be made of the following.

Kurabayashi et al. disclose a method of fabricating an electric double layer capacitor in U.S. Pat. No. 4,562,511. In this patent, an electrode comprises a porous sintered body of joined minute activated carbon particles, and a current collector is in the form of electrically conductive film made of a mixture of powder of an electrically conductive material such as carbon and either synthetic resin or rubber. In order to bind the current collector to the electrode, the surface of the current collector is dissolved by an organic solvent and the electrode is pressed against the dissolved surface of the current collector. The electrode is firmly bonded to the current collector when the solvent is evaporated, thereby fabricating the electrode with the low electric contact resistance between the electrode and the current collector.

Kurabayashi et al. disclose another method of fabricating an electric double layer capacitor in U.S. Pat. No. 5,072,336. In this patent, in order to reduce the electric contact resistance between an electrode and a current collector, they are contacted via conductive metallic films evaporated from metal such as Au, Ag, Ni, Pt, or Cu that is formed on respective surfaces of each of the electrode and the current collector. Furthermore, they disclose a method of binding between the electrodes and the current collector in a manner similar to the above-mentioned method using various binders in U.S. Pat. Nos. 4,562,511 and 5,121,301.

Nishino et al. in U.S. Pat. No. 4,562,511 disclose a method of using a metal layer formed on the surface of a carbon fiber or activated carbon electrode as a current collector. This patent considers various methods of forming a metal layer on the surface of the electrode such as plasma spraying, arc-spraying, vacuum deposition, sputtering, non-electrolytic plating, and use of conductive paints.

In U.S. Pat. Nos. 5,102,745, 5,304,330 and 5,080,963, Tatarchuk et al disclose a method of binding between an electrode and a current collector in the form of metal fiber by heating up to the melting point of the metal fiber. A process for binding between the metal fiber used in the current collector and carbon fibers used in the electrode is carried out as follows. Stainless steel fibers of about 2 μm in diameter and the carbon fibers of 1~5 μm in diameter are mixed uniformly with cellulose of 5 mm in length and water with agitation and then filtered, thus resulting in a mixed fiber composite for an electrode. This fiber composite is pressed in a mold into a thin sheet. Thus prepared sheet is then subjected to high temperature and pressure to bind the fibers at their points of crossing, thus being fabricated into an electrode having improved internal resistance. These patents further describe an additional fiber acting as a binder to assist in the binding between the above-mentioned fibers. The additional fiber includes metal, a ceramic, carbon or any combination thereof.

Farahmandi et al in U.S. Pat. Nos. 5,777,428 and 6,059,847 disclose an electrode comprising activated carbons woven into a cloth. Particularly, aluminum foil is used as a current collector, and the electrode is fabricated from the activated carbon cloth impregnated with molten aluminum. In this patent, the aluminum foil is bonded to the aluminum/carbon composite electrode by a diffusion bonding technique which is carried out at a temperature below 600° C. corresponding to the meting point of aluminum in order to avoid the formation of aluminum carbide resulting from a reaction between carbon and aluminum, which significantly reduces the performance of the electrode.

Zuckerbrod et al. in U.S. Pat. No. 4,448,856 disclose an electrode prepared by mixing powders of activated carbon and stainless steel with a binder. The density of the respective powders is limited to 25~450 μm, and these powders are coated onto a nickel wire or metal plate used as a current collector, thus fabricating the electrode.

The above-mentioned methods of fabricating activated carbon or activated carbon fiber electrodes represent various processes to reduce the resistance between the activated carbon electrode material and the current collector. It is possible to consider various methods of processing activated carbon into an electrode because activated carbon can be made into a fibrous form. However, it is impossible to make carbon nanotube or carbon nanofiber into a fibrous form, which imposes a limitation on fabricating a carbon nanotube or carbon nanofiber electrode. The most generalized method is to fabricate a carbon nanotube or carbon nanofiber electrode in a disk shape by pressing a mixture of carbon nanotubes or carbon nanofibers with a binder.

Niu et al. ["High Power Electrochemical Capacitors Based on Carbon Nanotube Electrodes", *Applied Physics Letters*, 70, pp.1480-1482 (1997)] reported a preparation of a carbon nanotube electrode in which about 10% of the functional groups at the surface of the carbon nanotubes are substituted by means of oxidizing treatment with nitric acid. The surface-treated electrode showed improved performance as compared to the non-treated electrode. Particularly, they demonstrated that the resistance between carbon nanotubes is improved by simple pressing without using a binder, and that the electrode is prepared without difficulties.

Ma et al ["Study of Electrochemical Capacitors Utilizing Carbon Nanotube Electrodes", *Journal of Power Sources*, 84, pp.126-129 (1999)] prepared a carbon nanotube electrode using phenolic resin (PF) powder as a binder. Particularly, they suggested several processes for fabricating the carbon nanotube electrode as follows: a molded mixture of carbon nanotubes and PF powders (electrode (a)); the molded mixture was carbonized by heat-treatment (electrode (b)); electrode (b) was immersed in a hot mixture of concentrated sulfuric acid and nitric acid, then washed and dried (electrode (c)). From the result of comparative experiment, electrode (a) showed the highest internal resistance because the binder deteriorates the electrode performance. Thus, it is necessary to carry out a carbonization process. The performance was the highest for electrode (c) which was treated with carbonization and nitric acid, and the next highest for electrode (b) treated only with carbonization.

An et al. ["Supercapacitors Using Single-Walled Carbon Nanotube Electrodes", *Advanced Materials*, 13, pp.479-500 (2001)] prepared a carbon nanotube electrode via pressing a mixture of carbon nanotubes with poly(vinyldene chloride) (PVdC) as a binder, followed by carbonization. Particularly, in order to improve the contact resistance between the carbon nanotubes and a Ni foil used as a current collector, they fabricated the electrodes using a plain Ni foil, a polished Ni foil and Ni foam as a current collector, respectively. From the ESR measurements for these electrodes, the ESRs for the polished Ni foil and the Ni foam were reduced to a half and a quarter of the ESR for the plain Ni, respectively.

Emmenegger et al. ["Carbon Nanotube Synthesized on Metallic Substrates", *Applied Surface Science* 162-163, pp 452-456 (2000)] prepared an electrode of carbon nanotubes grown on a substrate (Al or Si) which can be used as a current collector. The substrate was coated with metal on which carbon nanotubes can be grown. Then, carbon nanotube films were synthesized on the metal-coated substrate by a chemical vapor deposition (CVD) method, thus fabricating the electrode. It has been expected that this electrode has the reduced internal resistance because it is fabricated from well-aligned carbon nanotube films deposited on the current collector and also has a large surface area. The electrode prepared in this way, however, has drawbacks such as that the carbon nanotubes are easily separated from the current collector because the binding force between them is weak; the electrode has a low density of carbon nanotubes compared to electrodes fabricated by pressing carbon nanotubes; and it is difficult to synthesize highly crystallized carbon nanotubes on the current collector.

As shown in the aforementioned results of previous researches, a performance of a carbon nanotube electrode can be improved if the contact resistance between carbon nanotubes and a current collector is effectively reduced. From the patents and articles mentioned above, the use of organic binders can be considered as a generalized method for fabricating an electrode by processing carbon nanotubes using various methods. However, there is a drawback that the internal resistance is increased due to the organic binders in spite of an easy process with such binders.

Also, PF, PVdC and PTFE used as a binder have good affinity to carbon nanotubes, and thus these binders cover most of the surfaces of carbon nanotubes when mixed with carbon nanotubes and processed. Accordingly, in the case of carbonization after adding these organic binders, a whole surface of the carbon nanotube electrode is wrapped with carbons of a relatively high resistance which result from the heat decomposition of the organic binders.

Therefore, there is a need for improving the techniques and methods of fabricating a carbon nanotube or carbon nanofiber electrode in an effort to reduce its internal resistance and to increase its performance.

SUMMARY OF THE INVENTION

The present invention provides electrodes made of carbon nanotubes or carbon nanofibers that can be used in secondary batteries, supercapacitors or fuel cells, characterized in that the binding within the electrode material comprising carbon nanotubes or carbon nanofibers as well as between the electrode material and the current collector is achieved by using sulfur, metal or metal compound nanoparticles as a binder and by heating and/or pressing the electrode system, in order to reduce the internal resistance of the electrode, impart strong durability to the electrode, and minimize the contact resistance at the binding interfaces. According to the present invention, it is possible to provide a carbon nanotube or carbon nanofiber electrode having very low ESR and high performance.

It is an object of the invention to provide a carbon nanotube or carbon nanofiber electrode which comprises a current collector, a binder such as sulfur or metal nanoparticles, and carbon nanotubes or carbon nanofibers as an electrode material, wherein the sulfur or metal nanoparticles are bonded, deposited, or fused on the surfaces of the carbon nanotubes or carbon nanofibers so that the carbon nanotubes or carbon nanofibers are bonded to each other and also bonded to the current collector.

It is another object of the present invention to provide a process for preparing a carbon nanotube or carbon nanofiber electrode. Specifically, the process comprises the following steps: (1) preparing an electrode material by mixing the carbon nanotubes or carbon nanofibers with a binder such as sulfur or metal nanoparticles or by depositing the sulfur or metal nanoparticles on the carbon nanotubes or carbon nanofibers; (2) preparing a pressed electrode material by first pressing the electrode material; and (3) subsequently pressing or heat-treating the previously pressed electrode material that is placed on a current collector, thereby binding the carbon nanotubes or carbon nanofibers to each other and simultaneously binding the carbon nanotubes or carbon nanofibers to the current collector.

It is a further object of the invention to provide electric double layer capacitors, secondary batteries or fuel cells comprising the carbon nanotube or carbon nanofiber electrodes according to the present invention.

The foregoing and other objects, features and advantages of the present invention will be more apparent from a thorough consideration of the detailed description and drawing that follow.

BRIEF DESCRIPTION OF THE DRAWINGS

In the following detailed description, reference will be made to the attached drawing.

DETAILED DESCRIPTION OF THE PREFERRED EMBODIMENT

Figure 1:
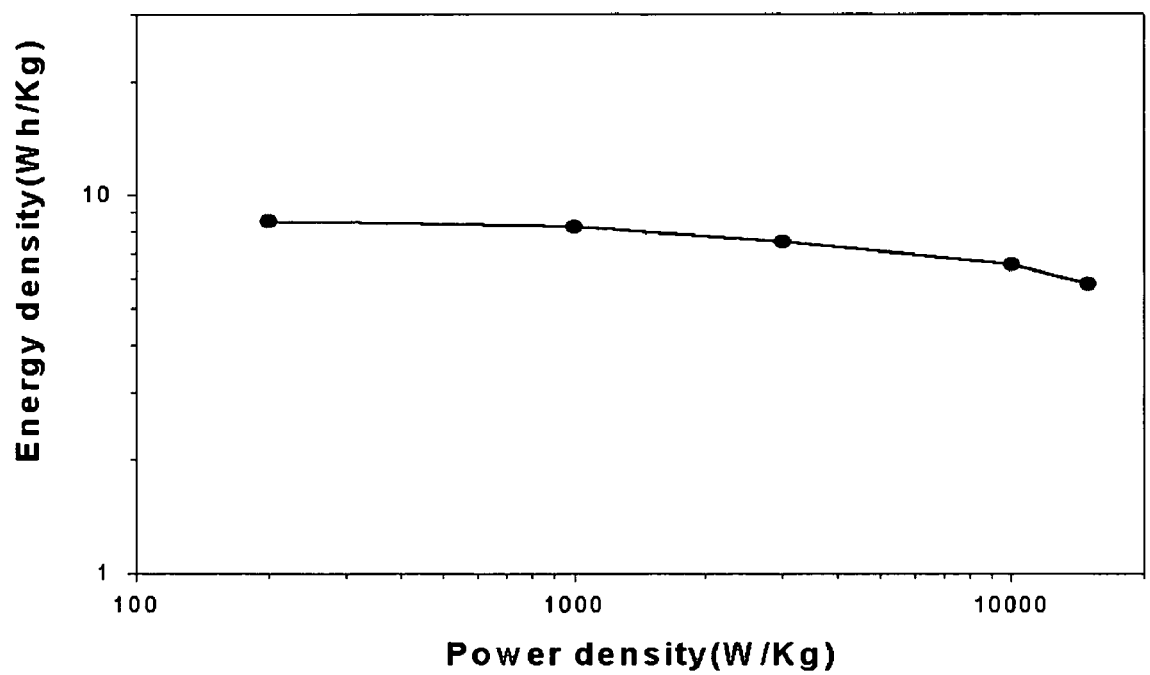
FIG. 1 is a Ragon plot obtained in Test 1 using an electrode prepared by deposition of copper nanoparticles as a binder on carbon nanotubes followed by heat treatment according to the present invention.

References will be made in detail to the preferred embodiments of the present invention, examples of which are illustrated in the accompanying drawing.

The present invention provides a carbon nanotube or carbon nanofiber electrode that comprises a current collector, a binder such as sulfur or metal nanoparticles, and carbon nanotubes or carbon nanofibers. The sulfur or metal nanoparticles as a binder are bonded, deposited, or fused on the surfaces of the carbon nanotubes or carbon nanofibers so that the carbon nanotubes or carbon nanofibers are bonded to each other and/or bonded to the current collector.

In a preferred embodiment of the present invention, the amount of the sulfur or metal nanoparticles used as the binder is in the range of from 0.01 to 3 times with respect to the amount by weight of the carbon nanotubes or carbon nanofibers.

In another preferred embodiment of the present invention, the metal constituting the metal nanoparticles may be selected from the group consisting of alkali metals, alkaline earth metals, representative metals and transition metals, and the metal nanoparticles can also comprise a material selected from the group consisting of metal itself, metal sulfides, metal carbides, metal oxides and metal nitrides.

When sulfur is used as the binder for the binding between the carbon nanotubes, it can be deposited on the surface of the carbon nanotubes by adding sulfur particles or by sulfurizing by various methods.

In still another preferred embodiment of the present invention, the sulfur or metal nanoparticles have an average particle size of 1 μm or less. In the present invention, the binder can comprise the sulfur or metal nanoparticles larger than 1 μm in size in the amount of 50% or less, preferably 30% or less, more preferably 10% or less, even more preferably 5% or less and still even more preferably 1% or less with respect to the amount by weight of the carbon nanotubes or carbon nanofibers, without deteriorating the effects of the present invention.

In still another preferred embodiment of the present invention, the current collector for the carbon nanotube or carbon nanofiber electrode can comprise a metallic material as the main constituent and may have a shape that can be selected from a plate, a network and foam.

In still another preferred embodiment of the present invention, the sulfur or metal nanoparticles are chemically bonded, or physically deposited or fused on the carbon nanotubes or carbon nanofibers by pressing a mixture of the sulfur or metal nanoparticles with the carbon nanotubes or carbon nanofibers under a pressure of from 1 to 500 atm, preferably from 1 to 100 atm, or by heat-treating the mixture at a temperature which is in the range of the melting point (M.P.) of metals or metal compounds ±500° C., preferably M.P. ±200° C., and more preferably M.P. ±100° C.

The present invention also provides a process for preparing a carbon nanotube or carbon nanofiber electrode. Specifically, the process comprises the following steps: (1) preparing an electrode material by mixing the carbon nanotubes or carbon nanofibers with a binder such as sulfur or metal nanoparticles or by depositing the sulfur or metal nanoparticles on the carbon nanotubes or carbon nanofibers; (2) preparing a pressed electrode material by first pressing the electrode material; and (3) subsequently pressing or heat-treating the previously pressed electrode material that is placed on a current collector, thereby binding the carbon nanotubes or carbon nanofibers to each other and simultaneously binding the electrode material to the current collector.

In a preferred embodiment of the present invention, the above step (2) can be carried out by uniformly dispersing the electrode material on the current collector and then primarily pressing, or by simultaneously performing both dispersing and primarily pressing the electrode material under a pressure of from 1 to 500 atm.

In another preferred embodiment of the present invention, in step (3), the metal nanoparticles are pressed under a pressure of from 1 to 500 atm or by heat-treating at a temperature which is in the range of the melting point of the used metals or metal compounds ±50~500° C. in an inert gas atmosphere.

In still another preferred embodiment of the present invention, sulfur can be added into the carbon nanotubes or carbon nanofibers using a method similar to the rubber vulcanization process, thereby binding between the carbon nanotubes or carbon nanofibers.

In still another preferred embodiment of the present invention, in the above step (1), mixing or applying the carbon nanotubes or carbon nanofibers with the sulfur or metal nanoparticles can be performed by a method chosen from the group consisting of physical mixing, microwave-mixing, solvent-mixing, and uniformly dispersing the sulfur or metal nanoparticles on the surfaces of the carbon nanotubes or carbon nanofibers.

The above-mentioned method of uniformly dispersing the sulfur or metal nanoparticles on the surfaces of the carbon nanotubes or carbon nanofibers can be carried out using a method selected from the group consisting of the impregnation method for catalysts followed by optional oxidation or reduction, precipitation, chemical vapor deposition (CVD), electrodeposition, plasma spraying and sputtering.

Meanwhile, in the present invention, when nanoparticles formed of a metal compound are deposited on the surface of carbon nanotubes or carbon nanofibers, this metal compound can be partially or completely transformed into metal, metal sulfide, metal carbide or metal nitride before and after the primary pressing, or before and after the secondary pressing/heat-treatment. After the transformation, the conductivity of the nanoparticles is increased and their processability is also enhanced due to ductility and malleability of metal, thereby increasing the effect of the metal nanoparticles as a binder. However, metal compounds are reduced only if it is necessary because metals such as Li can have an increased reactivity in some cases. Such transformation of metal compounds can be carried out using a conventional method used in the pertinent art, for example, reduction in the hydrogen gas, presulfiding using $H_2S$, etc.

In still another preferred embodiment of the present invention, the primary pressing is carried out under a pressure with which the carbon nanotubes or carbon nanofibers can be made into the shape of a disk or thin film. The pressure is generally in the range of from 1 to 100 atm.

In still another preferred embodiment of the present invention, the pressing and the heat-treatment in step (3) can be carried out simultaneously or consecutively.

In still another preferred embodiment of the present invention, the heat-treatment in step (3) can be performed using a heating method chosen from the group consisting of thermal heating, chemical vapor deposition, plasma heating, RF (radio frequency) heating, and microwave heating.

The present invention further provides electric double layer capacitors, secondary batteries or fuel cells comprising the carbon nanotube or carbon nanofiber electrode according to the embodiments described above.

In the present invention, the current collector comprises a metal plate, a metal network, or metal foam, and the electrode material comprises carbon-containing materials, particularly carbon nanotubes or carbon nanofibers.

As mentioned above, the carbon nanotubes or carbon nanofibers have a superior characteristic as an electrode material, but there still are problems to be solved for actually preparing the carbon nanotube or carbon nanofiber electrodes of high efficiency. For activated carbon, it is not difficult to be applied as an electrode material because activated carbon can be made into fibers. Also, if activated carbon is woven into a fibrous form together with metal fibers, the problem in binding to a current collector can be solved to an extent. However, carbon nanotubes, which have a diameter of only a few hundred nanometers with a length of only from a few to tens of micrometers, are substantially impossible to be woven into a fibrous form.

Accordingly, in order to fabricate an electrode, it is required to bind carbon nanotubes or carbon nanofibers to each other as well as to the current collector. Therefore, when carbon nanotubes or carbon nanofibers are used as the electrode material, these carbon nanomaterials should necessarily be processed using a binder.

In the present invention, because the sulfur or metal nanoparticles are used as a binder, the aforementioned electrode of carbon nanotubes or carbon nanofibers has the following advantages as compared to the traditional electrode using an organic or carbonaceous binder.

First, when sulfur or metal nanoparticles are used as the binder for the binding between the carbon nanotubes or carbon nanofibers, there is almost no internal resistance due to these binders, which is different from an organic or carbonaceous binder.

Secondly, the sulfur or metal nanoparticles as a binder are physically mixed with the carbon nanotubes or carbon nanofibers or deposited on their surfaces, followed by heat-treatment, thereby achieving the binding between carbon nanotubes or carbon nanofibers without deteriorating the inherent advantages of the carbon nanotubes or carbon nanofibers, which is different from traditionally used binders resulting in such a deterioration by covering the whole surfaces of carbon nanotubes or carbon nanofibers.

Next, in the aspect of durability which has been pointed out as a disadvantage of organic or carbonaceous binders, the binding using the sulfur or metal nanoparticles as a binder is highly advantageous when these binders are chosen from sulfur or metals that are resistant to the corrosion by the electrolyte.

Further, organic binders are susceptible to undergo a reaction with a corrosive electrolyte or to be dissolved into the electrolyte, but the sulfur or metal nanoparticles as a binder are not.

Accordingly, the above advantages make it possible to effectively utilize a carbon nanotube or carbon nanofiber electrode in the present invention as the cathode in a secondary battery. When a secondary battery is used for a long time, its life time or performance is decreased, which is mainly ascribed to the formation of solid materials precipitated at the time of charging which cause an internal short-circuit or a decrease in the accessible surface area by clogging an internal surface of an electrode. This problem is referred to "cathode clogging", which can be solved by using a carbon nanotube or carbon nanofiber electrode having no micropores and constituted by a structure leading to easy mass transfer. Particularly, carbon nanotube or carbon nanofiber electrodes prepared according to the method in the present invention, which have very low internal resistance and excellent durability, can exhibit superior performance as the cathode for a secondary battery.

In addition, a carbon nanotube or carbon nanofiber electrode according to the present invention has very low internal resistance and a favorable structure for reaction gas diffusion, thereby exhibiting superior performance as an electrode for a fuel cell as compared to traditional carbon electrodes.

In the present invention, nanoparticles of sulfur, metals or metal compounds are used as a binder with a sulfurizing process or with a pressing process at a temperature of the melting point of the metal nanoparticles or higher so that the carbon nanotubes are stably bonded to each other. Because the carbon nanotubes are bonded to each other using stable metal of substantially no resistance, the resulting carbon nanotube electrode has greatly improved internal resistance and excellent durability than an electrode fabricated using organic or carbonaceous binders.

Furthermore, in the present invention, a current collector and an electrode material is not physically bonded but bonded using energy to induce a direct bonding between the current collector and the electrode material, thereby minimizing the ESR of an electrode and providing a highly-efficient electrode.

The preparation of a carbon nanotube or carbon nanofiber electrode according to the present invention is more specifically described below.

As mentioned above, the present invention also provides a process for preparing a carbon nanotube or carbon nanofiber electrode having low internal resistance and specifically, the process comprises the steps of mixing sulfur or metal nanoparticles as a binder with the carbon nanotubes or carbon nanofibers or depositing the binder on the surfaces of the carbon nanotubes or carbon nanofibers using various deposition methods, and then pressing and/or heat-treating.

The above-mentioned pressing and heat-treatment can be carried out consecutively or simultaneously. Specifically, the mixture of the carbon nanotubes or carbon nanofibers with the nanoparticle binder can be pressed and then heat-treated, or the mixture can be heat-treated simultaneously with pressing. Also, the binding of the above mixture to a current collector can be achieved by pressing and heat-treating consecutively, or by pressing simultaneously with heat-treating.

According to a preferred embodiment of the present invention, in order to simplify the above-mentioned process, a carbon nanotube or carbon nanofiber electrode can be fabricated by uniformly dispersing the carbon nanotubes or carbon nanofibers deposited or mixed with the sulfur or metal nanoparticles on the current collector followed by pressing simultaneously with heat-treating.

In a process for preparing a carbon nanotube or carbon nanofiber electrode according to the present invention, it is important to uniformly mix the carbon nanotubes or carbon nanofibers with the sulfur or metal nanoparticles used as a binder, but a method of mixing them is not specifically limited. As the mixing method, mention may be made of physical mixing, ultrasonic mixing, generally dispersing in a solvent and then removing the solvent, and the like.

In the description of the present invention, the term "metal" indicates, without being particularly limited literally, any material having electrical conductivity. For example, it means any of the elements excluding nonmetals (in the Periodic Table, the elements of Group VIII, F, Cl, Br and I of Group VII, O of Group VI, N of Group V, and H of Group I) and semimetals (B of Group IIIB, C, Si and Ge of Group IV, and Se, Te and Po of Group V). Specifically, the term "metal" in the present invention includes, with no particular limitation, representative metals such as alkali metal and alkaline earth metal, transition metals, and any other metals having electrical conductivity and ability to bind carbon nanotubes or carbon nanofibers to each other by being mixed with the carbon nanotubes or carbon nanofibers or by being deposited on these carbon nanomaterials followed by pressing and heat-treating.

In the present invention, metal nanoparticles can comprise not only metal itself but also other metal compounds such as metal oxides, metal sulfides, metal nitride, metal carbides and the like. Accordingly, in the embodiments of the invention, the term "metal nanoparticles" includes not only metal nanoparticles but also nanoparticles of metal compounds.

In the present invention, the term "nanoparticles" means particles constituting the corresponding substance having an average diameter of 1 μm or less, preferably from 10 to 500 nm, and more preferably from 10 to 100 nm. In addition, it is preferred that the particle size distribution of the metal nanoparticles is such that 50% or more, preferably 70% or more, more preferably 90% or more of the particles having a diameter of 1 μm or less.

According to the present invention, the term "nanoparticles" also means that the size distribution of the particles constituting the corresponding material includes particles of nanometer scale in size and may substantially include particles having an average diameter of from a few to tens of micrometers if they could provide microscopic binding between carbon nanotubes or carbon nanofibers as an electrode material.

The methods for preparing the nanoparticles used as a binder comprise, without particular limitation, any conventional method that can provide nanoparticles, such as mechanical grinding, co-precipitation, spraying, the sol-gel method, electrolysis, the emulsion method, the reversed-phase emulsion method, or the like.

In addition, the methods for depositing nanoparticles on the surface of the carbon nanotubes or carbon nanofibers comprise, without particular limitation, any method that can deposit the nanoparticles as a binder on these carbon nanomaterials, such as impregnation which is generally used for catalyst deposition, precipitation, the sol-gel method, the CVD method which is generally used for metal deposition on a substrate, sputtering, evaporation method, or the like.

In the present invention, a process for pressing an electrode material comprising a mixture of carbon nanotubes or carbon nanofibers with sulfur or metal nanoparticles can be performed using traditionally used processes, and this mixture as an electrode material can be first pressed under a pressure of any value, for example, a pressure of from 1 to 500 atm, thus fabricating the electrode material into any desired shape, for example, into a disk shape.

Thus prepared electrode material is then pressed under a pressure of from 1 to 500 atm and/or heat-treated at a temperature where the nanoparticles of sulfur, metal or metal compounds can be made into a melted or similar state, and thus the sulfur or metal nanoparticles deposited on the carbon nanotubes or carbon nanofibers achieve three-dimensional junction or fusion between these carbon nanomaterials and also smooth binding between the electrode material and a current collector.

The methods for heat-treating the sulfur or metal nanoparticles deposited on the carbon nanotubes or carbon nanofibers may include, without particular limitation, any heating method that can heat sulfur, metal elements or metal compounds, such as thermal heating, the CVD method, plasma heating, radio-frequency heating, or microwave heating.

The temperature and time of the above-mentioned heat-treatment are varied with the kind of metal used as a binder, and they are not limited specifically as long as the conditions of the heat-treatment can achieve the junction or fusion between the carbon nanotubes or carbon nanofibers via, for example, physical and/or chemical changes such as melting or softening. The treatment temperature is particularly in the range of the melting point of the sulfur or metal nanoparticles ±500° C., preferably the melting point of the sulfur or metal nanoparticles ±200° C., more preferably the melting point of the sulfur or metal nanoparticles ±100° C., still more preferably the melting point of the sulfur or metal nanoparticles ±50° C. When the pressing and the heat-treatment are simultaneously carried out, the treatment temperature can be controlled according to the pressure for the pressing, and this temperature, for example, may be lowered as the pressure increases.

Furthermore, through the heat-treatment, the surface of a current collector can be melted or made into a similar state, thus binding the current collector to an electrode.

The present invention is more specifically described with reference to the following examples. It should be understood, however, that the invention is not limited to those examples described below.

Preparing Carbon Nanotube or Carbon Nanofiber Electrodes

EXAMPLE 1

This example represents the preparation of a carbon nanotube or carbon nanofiber electrode using Cu nanoparticles as a binder, wherein the Cu nanoparticles are prepared by depositing copper compound nanoparticles on the carbon nanotubes and then reducing these nanoparticles.

The carbon nanotubes (CNTs) used as the electrode material is single wall nanotubes (SWCNTs) (KH Chemicals Co., Ltd.) having an average diameter of 1 nm and a surface area of 210 m$^2$/g which is synthesized by catalytic evaporation.

A copper compound, $Cu(NO_3)_2$ was deposited on the carbon nanotubes in a weight ratio of 8:2 (CNT:Cu) using an impregnation method. The carbon nanotubes deposited with copper compound nanoparticle were dried at 110° C. for 1 day, and then reduced in a hydrogen atmosphere at 400° C. for 2 h. The as-prepared Cu nanoparticle deposited-carbon nanotubes were made into a disc shape by pressing at a pressure of 10 atm The disc of the Cu nanoparticle-deposited carbon nanotubes was placed on a Ni foil as a current collector having a thickness of 75 μm, and then was maintained at 900° C. for 10 min while pressed under a pressure of 10 atm in a nitrogen atmosphere. The electrode thus prepared in this example had a thickness of 150~300 μm.

EXAMPLE 2

The powder of the Cu nanoparticle-deposited carbon nanotubes prepared as in Example 1 was dispersed on a Ni foil as a current collector and then was maintained at 1100° C. while pressed in a nitrogen atmosphere, thus yielding an electrode. The exerted pressure was 10 atm and the pressing time was 5 min.

EXAMPLE 3

This example represents the preparation of a carbon nanotube electrode using Cu nanoparticles as a binder, wherein the Cu nanoparticles are prepared by the reverse-phase emulsion method.

The SWCNTs (KH Chemicals Co., Ltd.) as used in Example 1 were mixed with Cu nanoparticles with stirring (CNT:Cu=8:2 by weight) in a nitrogen atmosphere, wherein the Cu nanoparticles were alternatively prepared and have an average diameter of 30 nm. Then, the mixture was made into a disc shape by pressing under a pressure of 10 atm.

The Cu nanoparticle-deposited carbon nanotubes disc prepared above was placed on a Ni foil as a current collector having a thickness of 75 μm and then maintained at 1000° C. for 10 min while pressed under a pressure of 20 atm in a nitrogen atmosphere, thus yielding an electrode.

EXAMPLE 4

This example represents the preparation of a carbon nanotube electrode using Co nanoparticles as a binder that is prepared by depositing a cobalt compound on the carbon nanotubes and then reducing these nanoparticles.

A cobalt compound, $Co(NO_3)_2$ was deposited on the same SWCNTs (KH Chemicals Co., Ltd.) as used in Example 1 in a weight ratio of 8:2 (CNT:Co) by an impregnation method. The cobalt compound nanoparticle-deposited carbon nanotubes were dried at 110° C. for 1 day and then reduced in a hydrogen atmosphere at 400° C. for 2 h. The as-prepared, Co nanoparticle deposited-carbon nanotubes were made into a disc shape by pressing under a pressure of 10 atm The Co nanoparticle deposited-carbon nanotube disc was placed on a Ni foil as a current collector having a thickness of 75 μm and then maintained at 1200° C. for 10 min while pressed under a pressure of 10 atm in a nitrogen atmosphere, thus yielding an electrode.

EXAMPLE 5

This example represents the preparation of a carbon nanotube electrode using $CoS_2$ nanoparticles as a binder that is prepared by depositing a cobalt compound on the carbon nanotubes followed by pre-sulfiding the cobalt compound nanoparticles by $H_2S$.

A cobalt compound, $Co(NO_3)_2$ was deposited on the same SWCNTs (KH Chemicals Co., Ltd.) as used in Example 1 in a weight ratio of 8:2 (CNT:Co) by the impregnation method. The cobalt compound nanoparticle-deposited carbon nanotubes were dried at 110° C. for 1 day and then pre-sulfided by $H_2+H_2S$ mixed gas at 400° C. for 2 h. The as-prepared, $CoS_2$ nanoparticle deposited-carbon nanotubes were made into a disc shape by pressing under a pressure of 10 atm The Co nanoparticle deposited-carbon nanotube disc was placed on a Ni foil as a current collector having a thickness of 75 μm and then maintained at 700° C. for 10 min while pressed under a pressure of 10 atm in a nitrogen atmosphere, thus yielding an electrode.

EXAMPLE 6

This example represents the preparation of a carbon nanotube electrode using Cu nanoparticles as a binder deposited on carbon nanotubes by sputtering.

The same SWCNTs (KH Chemicals Co., Ltd.) as used in Example 1 were made into a disc shape having a thickness of from 100 to 300 μm by pressing under a pressure of 5 atm.

The as-prepared carbon nanotube disc was placed into a sputter (a thin-film maker) and the sputter was then evacuated to a vacuum of about $10^{-6}$ Torr. Then, the pressure in the sputter was controlled to about $2 \times 10^{-2}$ Torr by flowing the Ar gas. The Ar plasma was formed by exerting DC voltage and then a metallic copper target was sputtered for 5 min. After the copper was sputter-deposited on the carbon nanotubes disc, the disc was removed from the sputter and then grounded into powder. The obtained powder was mixed uniformly and pressed again under a pressure of 5 atm into a disc shape. The as-prepared disc was placed into the sputter again, and the copper was sputtered as described above.

A cycle of sputtering-grinding-pressing was repeated 20 times to result in a powder of Cu nanoparticle-deposited carbon nanotubes, and finally the powder was pressed into a disc under a pressure of 10 atm.

The Cu particle-deposited carbon nanotube disc prepared above was placed on a Ni foil as a current collector having a thickness of 75 μm and then maintained at 1000° C. for 10 min while pressed under a pressure of 10 atm in a nitrogen atmosphere, thus yielding an electrode.

EXAMPLE 7

This is an example of preparing a carbon nanotube electrode for a fuel cell by depositing Pt on the carbon nanotubes disc prepared in Example 1.

The disc of carbon nanotubes prepared in Example 1 was impregnated with a $H_2PtCl_6$ aqueous solution and then the disc was dried at 110° C. The disc was reduced by flowing a hydrogen gas at 400° C. for 2 h, thus resulting in a carbon nanotube electrode for a fuel cell.

EXAMPLE 8

This is an example of preparing a carbon nanotube electrode for a fuel cell using Pt nanoparticles as a binder, in which nanoparticles of platinum compound were deposited on carbon nanotubes and then reduced.

A platinum compound, $H_2PtCl_6$ was deposited on the SWCNTs as used in Example 1 (CNT:Pt=95:5 in a weight ratio) by impregnation. Then, the Pt compound nanoparticle-deposited carbon nanotubes were dried at 110° C. for 1 day and reduced by flowing a hydrogen gas at 400° C. for 2 h. The as-prepared Pt nanoparticle-deposited carbon nanotubes were placed on a Ni foil as a current collector having a thickness of 75 μm and maintained at 1500° C. for 10 min while pressed under a pressure of 10 atm in a nitrogen atmosphere, thus preparing the electrode.

EXAMPLE 9

This example represents the preparation of a carbon nanotube electrode using atomic sulfur as a binder.

The carbon nanotubes as used in Example 1 were mixed with atomic sulfur in a weight ratio of 95:5 (CNT:S). Unlike other metal binders, it is possible to use a small amount of sulfur for preparing the electrode because sulfur is capable of chemically binding between the adjacent carbon nanotubes by reacting with the carbon nanotubes. A process such as this is called vulcanization. The above-prepared material of the carbon nanotubes physically mixed with sulfur was pressed under 10 atm and then subjected to vulcanization at 200° C. for 30 min, thus yielding an electrode.

Test of Electrode Performance

Performance tests of all the above-prepared electrodes were carried out as described below.

A 7 M KOH aqueous solution was used as the electrolyte for the electrodes. The above-prepared electrodes were each fabricated to have a diameter of 1.5 cm. The separator for the electrodes was a polymer separating membrane (Celgard Inc.). The gap between two electrodes was maintained at 300 µm. The resistivity of the electrodes was measured by the Van der Pauw method.

Test 1

The resistivity of the electrode prepared in Example 1 was measured to be 9.1 mΩ·cm using the Van der Pauw method. The equivalent series resistance (ESR) of the unit cell was obtained to be 35 mΩ by extrapolation from a complex plane impedance plot. The capacitance was measured to be 175 F/g in a manner of supplying a constant current with DC voltage. After charging to 1 V, the energy density and power density were measured with varying the current from 1 to 50 mA. The power density was 15 kW/kg and the energy density 5.8 Wh/kg, as calculated by weight of the whole electrode. A Ragon plot of the electrode in the unit cell is shown in FIG. 1.

Test 2

The resistivity of the electrode prepared in Example 2 was measured to be 10 mΩ·cm. The equivalent series resistance (ESR) of the unit cell was obtained to be 41 mΩ by extrapolation from a complex plane impedance plot.

Test 3

The resistivity of the electrode prepared in Example 3 was measured to be 25 mΩ·cm. The ESR of the unit cell was obtained to be 151 mΩ by extrapolation from a complex plane impedance plot.

Test 4

The resistivity of the electrode prepared in Example 4 was measured to be 15 mΩ·cm. The ESR of the unit cell was obtained to be 91 mΩ by extrapolation from a complex plane impedance plot.

Test 5

The resistivity of the electrode prepared in Example 5 was measured to be 27 mΩ·cm. The ESR of the unit cell was obtained to be 95 mΩ by extrapolation from a complex plane impedance plot.

Test 6

The resistivity of the electrode prepared in Example 6 was measured to be 14.4 mΩ·cm. The ESR of the unit cell was obtained to be 88 mΩ by extrapolation from a complex plane impedance plot.

Test 7

The resistivity of the electrode prepared in Example 9 was measured to be 13 mΩ·cm using the Van der Pauw method. The ESR of the unit cell was obtained to be 102 mΩ by extrapolation from a complex plane impedance plot. The capacitance of the electrode was measured to be 155 F/g in a manner of supplying a constant current with DC voltage. After charging to 1 V, the energy density and power density of the electrode were measured with varying the current from 1 to 50 mA. The power density was 12.5 kW/kg and the energy density 4 Wh/kg, as calculated by weight of the whole electrode.

From the above results according to the embodiment of the present invention, it is found that the preparation of electrodes using sulfur or metal nanoparticles as a binder is a very useful process to reduce the internal resistance of electrodes.

Therefore, an electrode prepared according to the present invention has internal resistance lower than the values of internal resistance reported previously, and this proves that the use of sulfur or metal nanoparticles as a binder is a better process for binding carbon nanotubes to each other as compared to traditional processes such as binding using organic binders or binding after surface treatments.

Moreover, an electrode prepared according to the present invention has an electrostatic capacity of 175 F/g. This value is close to the theoretical value of electrostatic capacity that can be conventionally obtained in electrodes formed of carbon nanotubes and also close to the largest electrostatic capacity of 180 F/g reported so far.

Furthermore, as shown in the result of Test 1, the ESR of the electrode is so small that the power density of the electrode appears to be very high. Therefore, it is found that the variation of the energy density according to the power density is very small as indicated in FIG. 1.

Therefore, it is expected that carbon nanotube or carbon nanofiber electrodes prepared according to the present invention have low internal resistance, strong durability and very low ESR, and thus the electrodes are very useful as an electrode for secondary batteries, supercapacitors or fuel cells. It is also expected that such electrodes can produce more stable electric equipment of a higher performance compared to traditionally used electrodes.

Further, although the invention has been variously disclosed herein with reference to illustrate embodiments and features described hereinabove, modifications and other embodiments will suggest themselves to those having ordinary skill in the art. The invention therefore is to be broadly construed to be consistent with the claims hereafter set forth.

What is claimed is:

1. A process for preparing a carbon nanotube electrode, consisting:
   (1) preparing an electrode material consisting essentially of carbon nanotubes mixed with a binder selected from the group consisting of sulfur having an average particle size of 1 μm or less, metal nanoparticles having an average particle size of 1 μm or less and both of them;
   (2) preparing a pressed electrode material by first pressing the electrode material under a pressure from 1 to 500 atm or about 1.033 to about 516.615 kgf/cm$^2$; and
   (3) subsequently pressing under a pressure from 1 to 500 atm or about 1.033 to about 516.615 kgf/cm$^2$, or heat-treating at a temperature in the range of the melting point of the sulfur or metal nanoparticles ±200° C. in inert gas atmosphere, or simultaneously pressing under the said pressure and heat-treating at the said temperature in inert gas atmosphere the previously pressed electrode material that is placed on a current collector so that the carbon nanotubes are bonded to each other and simultaneously bonded to the current collector, by the binder being bonded, deposited, or fused on the surfaces of the carbon nanotubes;
   wherein the binder has the effect of minimizing the internal resistance of the electrode.

2. The process according to claim 1, wherein in (2), the electrode material is uniformly dispersed on a current collector and then pressed, or simultaneously dispersed and pressed.

3. The process according to claim 1, wherein in (1), the mixing of carbon nanotubes with the binder is performed by a method chosen from the group consisting of physical mixing, ultrasonic-mixing, solvent-mixing, and uniformly dispersing the sulfur or metal nanoparticles on the surfaces of the carbon nanotubes.

4. The process according to claim 3, wherein the method of uniformly dispersing sulfur or metal nanoparticles on the surfaces of carbon nanotubes is carried out by a method selected from the group consisting of catalytic impregnation followed by an optional oxidation or reduction, precipitation, chemical vapor deposition (CVD), electrodeposition, plasma spraying, and sputtering.

5. The process according to claim 1, wherein the primary pressing in (2) provides the electrode material in the shape of a disk or thin film.

6. The process according to claim 1, wherein in (3), the pressing and the heat-treatment are carried out simultaneously or consecutively.

7. The process according to claim 1, wherein in (3), the heat-treatment is carried out by a heating method selected from the group of thermal heating, chemical vapor deposition, plasma heating, RF (radio frequency) heating, and microwave heating.

8. A secondary battery comprising the carbon nanotube electrode prepared according to the process of claim 1.

9. A process for preparing a carbon nanotube electrode, comprising:
   (1) preparing an electrode material by depositing a binder selected from the group consisting essentially of sulfur having an average particle size of 1 μm or less, metal nanoparticles having an average particle size 1 μm of or less and both of them on the carbon nanotubes;
   (2) preparing a pressed electrode material by first pressing the electrode material under a pressure from 1 to 500 atm or about 1.033 to about 516.615 kgf/cm$^2$; and
   (3) subsequently pressing under a pressure from 1 to 500 atm or about 1.033 to about 516.615 kgf/cm$^2$, or heat-treating at a temperature in the range of the melting point of the sulfur or metal nanoparticles ±200° C. in inert gas atmosphere, or simultaneously pressing under the said pressure and heat-treating at the said temperature in inert gas atmosphere the previously pressed electrode material that is placed on a current collector so that the carbon nanotubes are bonded to each other and simultaneously bonded to the current collector, by the binder being bonded, deposited, or fused on the surfaces of the carbon nanotubes;
   wherein the binder has the effect of minimizing the internal resistance of the electrode.

10. The process according to claim 9, wherein in (2), the electrode material is uniformly dispersed on a current collector and then pressed, or simultaneously dispersed and pressed.

11. The process according to claim 9, wherein in (1), the depositing of the binder on the carbon nanotubes is performed by a method chosen from the group consisting of physical mixing, ultrasonic-mixing, solvent-mixing, and uniformly dispersing the sulfur or metal nanoparticles on the surfaces of the carbon nanotubes.

12. The process according to claim 11, wherein the method of uniformly dispersing sulfur or metal nanoparticles on the surfaces of carbon nanotubes is carried out by a method selected from the group consisting of catalytic impregnation followed by an optional oxidation or reduction, precipitation, chemical vapor deposition (CVD), electrodeposition, plasma spraying, and sputtering.

13. The process according to claim 9, wherein the primary pressing in (2) provides the electrode material in the shape of a disk or thin film.

14. The process according to claim 9, wherein in (3), the pressing and the heat-treatment are carried out simultaneously or consecutively.

15. The process according to claim 9, wherein in (3), the heat-treatment is carried out by a heating method selected from the group of thermal heating, chemical vapor deposition, plasma heating, RF (radio frequency) heating, and microwave heating.

16. A secondary battery comprising the carbon nanotube electrode prepared according to the process of claim 9.

* * * * *